US012768314B2

(12) United States Patent
Gonidec et al.

(10) Patent No.: US 12,768,314 B2
(45) Date of Patent: Oct. 20, 2026

(54) THRUST REVERSER COMPRISING AN IMPROVED SYSTEM FOR DEPLOYING A MEMBRANE FOR SEALING OFF THE SECONDARY FLOW PATH

(71) Applicant: SAFRAN NACELLES, Gonfreville-l'Orcher (FR)

(72) Inventors: Patrick Gonidec, Moissy-Cramayel (FR); François Bellet, Moissy-Cramayel (FR); Philippe Wiertel, Moissy-Cramayel (FR); Julien Chandelier, Moissy-Cramayel (FR); Patrick André Boileau, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 19/133,283

(22) PCT Filed: Dec. 11, 2023

(86) PCT No.: PCT/FR2023/051971

§ 371 (c)(1),
(2) Date: May 28, 2025

(87) PCT Pub. No.: WO2024/126934

PCT Pub. Date: Jun. 20, 2024

(65) Prior Publication Data

US 2026/0194028 A1 Jul. 9, 2026

(30) Foreign Application Priority Data

Dec. 14, 2022 (FR) ........................................ 2213385

(51) Int. Cl.

*F02K 1/64* (2006.01)
*F02K 1/72* (2006.01)
*F02K 1/76* (2006.01)

(52) U.S. Cl.

CPC .................. *F02K 1/72* (2013.01); *F02K 1/64* (2013.01); *F02K 1/76* (2013.01); *F02K 1/763* (2013.01);

(Continued)

(58) Field of Classification Search

CPC ..... F02K 1/64; F02K 1/72; F02K 1/76; F02K 1/763; F02K 1/766; F05D 2220/323; F05D 2240/14; F05D 2260/50; F05D 2300/601

See application file for complete search history.

(56) References Cited

U.S. PATENT DOCUMENTS 3,599,432 A * 8/1971 Ellis ........................ F02K 1/645 60/230
11,401,887 B2 * 8/2022 Gonidec ................ B64D 29/06

(Continued)

FOREIGN PATENT DOCUMENTS

FR 3076864 A1 7/2019
FR 3087848 A1 5/2020

(Continued)

OTHER PUBLICATIONS

International Search Report and Written Opinion for Application No. PCT/FR2023/051971 filed on Dec. 11, 2023, mailed Mar. 11, 2024, International Searching Authority EP.

*Primary Examiner* — William H Rodriguez
(74) *Attorney, Agent, or Firm* — McDonald Hopkins LLC

(57) ABSTRACT

A thrust reverser for an aircraft propulsion assembly, comprising a membrane for sealing off a secondary flow path, as well as at least one deployment connecting rod for deploying this membrane, which is designed to be moved from a first position projecting radially into the secondary flow path when the mobile structure is occupying its advanced direct-thrust position, to a second position folded down toward the downstream direction when the mobile structure is occupying its retracted thrust-reversal position. According to the invention, the reverser also comprises a device for actuating the connecting rod, the reverser being configured such that during an initial phase of movement of the mobile structure from its advanced direct-thrust position towards its retracted (Continued)

thrust-reversal position, the actuating device causes a first articulated connection of the connecting rod to move radially inwards and/or axially upstream.

10 Claims, 11 Drawing Sheets

(52) U.S. Cl.
CPC ........ *F02K 1/766* (2013.01); *F05D 2220/323* (2013.01); *F05D 2240/14* (2013.01); *F05D 2260/50* (2013.01)

(56) References Cited

U.S. PATENT DOCUMENTS

| | | | | |
|---|---|---|---|---|
| 12,378,929 | B2 * | 8/2025 | Gonidec | F02K 1/72 |
| 12,378,930 | B2 * | 8/2025 | Ferrier | F02K 1/72 |
| 12,429,013 | B2 * | 9/2025 | Chandelier | F02K 1/72 |
| 12,618,382 | B2 * | 5/2026 | Gonidec | F02K 1/72 |
| 2020/0347800 | A1 * | 11/2020 | Gonidec | F02K 1/625 |
| 2025/0101931 | A1 * | 3/2025 | Gonidec | F02K 1/72 |
| 2025/0109723 | A1 * | 4/2025 | Ferrier | F02K 1/72 |
| 2025/0243826 | A1 * | 7/2025 | Chandelier | F02K 1/72 |
| 2025/0314219 | A1 * | 10/2025 | Bellet | F02K 1/72 |
| 2025/0376963 | A1 * | 12/2025 | Gonidec | F02K 1/72 |

FOREIGN PATENT DOCUMENTS

| | | | | |
|---|---|---|---|---|
| FR | 3168916 | A1 * | 5/2026 | F02K 1/72 |
| WO | WO-2025133542 | A1 * | 6/2025 | F02K 1/763 |
| WO | WO-2026083026 | A1 * | 4/2026 | F02K 1/72 |

* cited by examiner

THRUST REVERSER COMPRISING AN IMPROVED SYSTEM FOR DEPLOYING A MEMBRANE FOR SEALING OFF THE SECONDARY FLOW PATH

CROSS-REFERENCE TO RELATED APPLICATION

This application is a 35 U.S.C. § 371 national stage application of PCT Application No. PCT/FR2023/051971 filed on Dec. 11, 2023, which claims priority to French Patent Application No. FR 2213385 filed on Dec. 14, 2022, each of which are incorporated herein in their entirety by reference.

TECHNICAL FIELD

The invention relates to the field of nacelles and thrust reversers for an aircraft propulsion assembly, and, more particularly, to systems enabling the deployment of membranes for sealing off the secondary flow path of a propulsion assembly.

PRIOR ART

Thrust reversers are devices allowing deflecting the air flow through the propulsion assembly toward the front, so as to shorten the landing distances and limit the load on the brakes on the landing gears.

Cascade reversers currently used in the aeronautical sector generally comprise deflection cascades integrated into a fixed structure of the reverser, intended to be connected to a turbine engine casing. A mobile structure of the reverser comprises one or more mobile reverser cowl(s), and it is mounted translatable relative to the fixed structure between an advanced direct-thrust position, and a retracted thrust-reversal position. In the advanced direct-thrust position, the deflection cascades are arranged in a cavity of the mobile reverser cowls, and they are isolated from the secondary flow path of the propulsion assembly by a radially inner wall of the reverser cowls. On the other hand, in the retracted thrust-reversal position, the radially retracted inner wall of the reverser cowls defines a passage opening from the secondary flow path toward the deflection cascades.

To deflect at least a part of the secondary flow toward this passage opening in the direction of the cascades, the reverser is generally equipped with sealing flaps, which, when deployed, at least partially seal off the secondary flow path. In a known manner, this forces the air from the secondary flow to pass through the passage opening and to join the cascades, which then generate the counter-pressure air flow toward the front.

The sealing flap solution is also known to be relatively onerous and cumbersome. However, climate change is a major concern for many legislative and regulatory bodies around the world. Indeed, various restrictions on carbon emissions have been, are or will be adopted by various states. In particular, an ambitious standard is applied not only to new types of aircraft but also to those in circulation requiring the implementation of technological solutions to make them compliant with the regulations in force. Civil aviation has been taking action for several years now to make a contribution to the fight against climate change.

Consequently, the Applicant is continuously working to reduce its negative climate impact through the use of methods and the operation of virtuous development and manufacturing processes and by minimizing greenhouse gas emissions to as little as possible to reduce the environmental footprint of its activity.

With this in mind, solutions for sealing off the secondary flow path using one or more deployable membranes have been developed. Such a membrane design is for example known from document FR 3 076 864 A1.

The deployment of a sealing membrane can be carried out more readily using one or more deployment connecting rods, a radially outer end of which is connected to an end of the membrane, and a radially inner end of which is articulated on a radially inner wall delimiting the secondary flow path, this wall belonging to the fixed structure of the reverser.

When the mobile structure moves towards its retracted thrust-reversal position, the membrane is deployed progressively in the flow path by being immersed radially therein, driven by the connecting rod(s) which tilt(s) in the downstream direction and also radially inward.

In the direct jet position, the end of the membrane connected to the connecting rods is generally clamped between a deflection edge of the fixed structure, and an upstream end of the radially inner wall of the mobile cowl.

While this technical solution is generally satisfactory, during an initial phase of movement of the mobile structure from its advanced direct-thrust position to its retracted thrust-reversal position, there is a need to limit the risks of pressing the membrane on an inner surface of the radially inner wall of the mobile cowl. Indeed, such pressing of the membrane impedes its proper radially inward deployment, and is therefore not desirable.

Moreover, again in the direct jet position, the radially outer end of each deployment connecting rod is very close to the upstream end of the radially inner wall of the mobile cowl. Their two simultaneous movements are not without risk, and there is therefore also a need to limit any mechanical interferences between the radially outer end of each connecting rod and the upstream end of the radially inner wall of the mobile cowl, whether during the initial phase of movement of the mobile structure to its retracted thrust-reversal position, or during the final phase of movement of the mobile structure to its advanced direct-thrust position.

DISCLOSURE OF THE INVENTION

To at least partially meet these needs, the invention firstly relates to a thrust reverser for an aircraft propulsion assembly, the reverser comprising a fixed structure equipped with a radially inner wall delimiting a secondary flow path of the propulsion assembly intended to be crossed by a secondary flow, the reverser also comprising a mobile structure comprising at least one mobile reverser cowl equipped with a radially inner wall contributing to the radially outer delimitation of the secondary flow path, the mobile structure being mobile relative to the fixed structure between an advanced direct-thrust position, and a retracted thrust-reversal position wherein the fixed structure and an upstream end of the retracted radially inner wall of the mobile reverser cowl allow an air passage opening through the secondary flow path to appear between them, the thrust reverser also comprising at least one membrane for sealing off the secondary flow path, configured to deflect at least a part of the secondary flow to the passage opening, as well as at least one deployment connecting rod arranged in the secondary flow path of which a first end is connected, via a connection point, to a first end of the sealing membrane, the connecting rod for deploying the membrane being designed to be moved from a first position projecting radially into the secondary flow path when the mobile structure is occupying its advanced direct-thrust position, to a second position folded down toward the downstream direction when the mobile structure is occupying its retracted thrust-reversal position, and vice versa.

According to the invention, the reverser also comprises a device for actuating the deployment connecting rod, the device connecting the radially inner wall delimiting the flow path to a second end of the deployment connecting rod opposite the first, via a first articulated connection, and the reverser is configured such that during an initial phase of movement of the mobile structure from its advanced direct-thrust position to its retracted thrust-reversal position, the actuating device causes said first articulated connection of the deployment connecting rod to move radially inward and/or axially upstream.

Thanks to this particular movement of the deployment connecting rod at the start of the opening phase of the reverser, which makes it possible to pull the membrane upstream and/or inward with the effect of detaching it, the risks of undesired pressing of this membrane on the mobile cowl are advantageously reduced, or even zero. The same applies for risks of mechanical interferences between the deployment connecting rod and the upstream end of the radially inner wall of the mobile cowl, both during the initial phase of movement of the mobile structure to its retracted thrust-reversal position, and during the final phase of movement of the mobile structure to its advanced direct-thrust position.

The invention is also in line with technological research aimed at very significantly improving the performance of aircraft and, accordingly, contributes to reducing their environmental impact, here by using lightweight and compact membranes for sealing off the secondary flow.

The invention preferably provides at least one of the following optional technical features, implemented alone or in combination.

Preferably, the actuating device comprises an actuating member having a first end at which said first articulated connection of the deployment connecting rod is located, as well as a second end opposite the first, connected to the radially inner wall delimiting the flow path via a second articulated connection, and in the advanced direct-thrust position of the mobile structure, the deployment connecting rod and the actuating member form a projecting angle opening in the downstream direction.

This design also advantageously makes it possible to tolerate relative radial movements between the radially inner and outer walls delimiting the flow path. Indeed, these radial movements can occur depending on the different reverser part loading scenarios, but also due to the appearance of play in the reverser following wear of the parts over time.

Preferably, the actuating device comprises stressing means designed to:

- force the actuating member to tilt about the second articulated connection in a first direction of rotation, said first direction of rotation being such that it causes the first end of the actuating member to be tilted in the upstream direction during said initial phase of movement of the mobile structure from its advanced direct-thrust position to its retracted thrust-reversal position; and
- force the deployment connecting rod to tilt relative to the actuating member, about the first articulated connection and in a second direction of rotation opposite the first direction.

These forces developed by the stressing means cause the membrane to be under tension, whether in the direct jet position, and/or during the opening/closure of the reverser. This confers a better stability on this membrane.

Preferably, the stressing means have a passive design, and they comprise elastic return means. Alternatively, they could consist of controlled means, only activated at times when stress is desired, for example during the opening and/or closure of the reverser, or only during certain phases of these operations on the reverser. As stated above, a passive design which also makes it possible to generate the desired forces in the direct jet position, in order to tension the membrane and reinforce its stability in the cavity wherein it remains stored, is nevertheless preferred.

A hybrid design can also be envisaged, wherein elastic means would make it possible to generate the desired forces, but in combination with control means to adjust the stiffness of these elastic means according to needs. For example, the stiffness could be adjusted during the opening of the reverser, such that the intensity of the forces generated remain high enough to maintain the expected effect.

Preferably, the deployment connecting rod and the actuating member form a three-point mechanical system together with respectively the connection point of the membrane, the first articulated connection and the second articulated connection, the reverser being designed such that during the movement of the mobile structure from its advanced direct-thrust position to its retracted thrust-reversal position, a relative movement of the deployment connecting rod relative to the actuating member, about the first articulated connection, takes place beyond a position wherein said three points are aligned, up to a mechanical locking position of the connecting rod.

The locking position of the connecting rod advantageously allows it to keep the membrane deployed in a tensioned manner, and to withstand very high-intensity stress, which would remain extremely difficult to counteract using simple elastic return means. This locking position is achieved by the three-point mechanical system preferably during a final phase of movement of the mobile structure, to its retracted thrust-reversal position.

Preferably, the mechanical system comprises stop means for holding this system in the mechanical locking position of the connecting rod.

According to a first preferred embodiment of the invention, said stressing means comprise:

- first elastic return means for forcing the actuating member to tilt about the second articulated connection in the first direction of rotation, said first elastic means preferably comprising a hinge spring or a spring cylinder acting on an arm integral with the actuating member; and
- second elastic return means for forcing the deployment connecting rod to tilt relative to the actuating member, about the first articulated connection in the second direction of rotation, said second elastic means preferably comprising a hinge spring.

According to a second preferred embodiment of the invention, said stressing means comprise:

- third elastic return means;
- a transmission member of which a first end is connected to the third elastic means, and of which a second end opposite the first is mounted on the deployment connecting rod, between the first articulated connection and the connection point; and
- a return pulley about which the transmission member travels, this pulley being arranged such that the third elastic means transmit to the connecting rod, via the transmission member, forces simultaneously forcing the actuating member to tilt about the second articulated connection in the first direction of rotation, and the deployment connecting rod to tilt relative to the actuating member, about the first articulated connection in the second direction of rotation.

In this second preferred embodiment of the invention, the third elastic means therefore make it possible to act simultaneously on the two articulated connections, for greater compactness of said third stressing means.

Preferably, in the advanced direct-thrust position of the mobile structure, the transmission member, for example in the form of a cable, starts from its second end in the direction of the return pulley by bypassing the first articulated connection on the side of said projecting angle.

Preferably, the fixed structure of the reverser comprises at least one deflection cascade arranged, in the advanced direct-thrust position of the mobile structure, in a cavity of the mobile cowl, while being isolated from the secondary flow path by the radially inner wall of the reverser cowl. Alternatively, the deflection cascade(s) could be integrated into the mobile structure of the reverser, without departing from the scope of the invention. Similarly, it is noted that the cascades may be replaced, or provided in combination, with a membrane type flexible structure, to redirect the air flow in the upstream direction.

Finally, the invention also relates to an aircraft propulsion assembly comprising a turbine engine and a nacelle comprising at least one fan cowl, as well as a thrust reverser as described above.

Other advantages and features of the invention will become apparent in the following non-limiting detailed description.

BRIEF DESCRIPTION OF THE DRAWINGS

The following detailed description refers to the appended drawings wherein.

DETAILED DESCRIPTION OF SOME EMBODIMENTS

Figure 1:
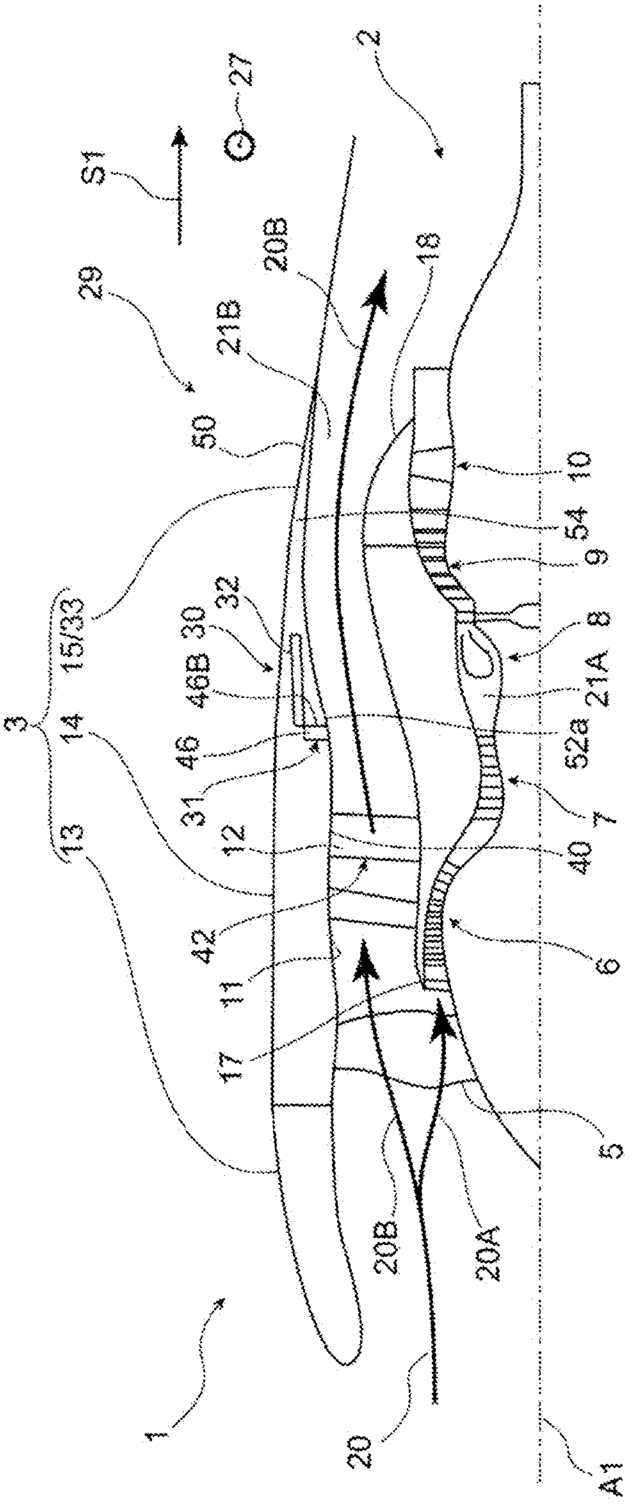
FIG. 1 is a schematic longitudinal sectional half-view of a propulsion assembly comprising a thrust reverser, shown in a direct-thrust configuration.

An aircraft propulsion assembly 1 is shown in FIG. 1, having a longitudinal central axis A1.

Subsequently, the terms “upstream” and “downstream” are defined relative to a general direction S1 of flow of gases through the propulsion assembly 1, along the axis A1 when it is generating thrust. These “upstream” and “downstream” terms could be substituted by the terms “front” and “rear”, respectively, with the same meaning.

The propulsion assembly 1 comprises a turbine engine 2, a nacelle 3 as well as a mast (not shown), intended to connect the propulsion assembly 1 to a wing (not shown) of the aircraft.

The turbine engine 2 is, in this example, a bypass, twin-spool turbojet engine comprising, from front to rear, a fan 5, a low-pressure compressor 6, a high-pressure compressor 7, a combustion chamber 8, a high-pressure turbine 9 and a low-pressure turbine 10. The compressors 6 and 7, the combustion chamber 8 and the turbines 9 and 10 form a gas generator. The turbojet engine 2 is provided with a fan casing 11 connected to the gas generator by structural arms 12.

The nacelle 3 comprises a front section forming an air inlet 13, a middle section that comprises two fan cowls 14 enveloping the fan casing 11, and a rear section 15.

In operation, an air flow 20 enters the propulsion assembly 1 through the air inlet 13, passes through the fan 5 then splits into a primary flow 20A and a secondary flow 20B. The primary flow 20A flows into a primary flow path 21A for the circulation of gases passing through the gas generator. The secondary flow 20B flows into a secondary flow path 21B surrounding the gas generator. The secondary flow path 21B is delimited radially inwards by a fixed inner shroud that surrounds the gas generator. In this example, the fixed inner shroud comprises a first segment 17 belonging to the middle section 14, and a second segment 18 extending toward the rear from the first segment 17, so as to form a part of the rear section 15. This second segment 18 is an integral part of a fixed structure of a thrust reverser which will be described below. This same segment will subsequently be referred to as the radially inner wall 18 delimiting the secondary flow path 21B.

Radially outward, the secondary flow path 21B is delimited by the fan casing 11, and, in the configuration of FIG. 1, by one or more mobile reverser cowls 33 forming a part of the rear section 15 of the nacelle 3, and which will be described hereinafter. More specifically, between the fan casing 11 and the reverser cowls 33, an outer shell 40 of an intermediate casing 42 is provided, the latter comprising the aforementioned structural arms 12, the radially outer end of which is attached to this shell 40. It therefore also contributes to delimiting the secondary flow path 21B radially outward, by being located in the axial extension downstream of the fan casing 11.

The nacelle 3 therefore comprises a thrust reverser 30 centered on the axis A1 and comprising, on the one hand, a fixed structure 31 integral with the fan casing 11, and, on the other hand, a mobile structure 29 relative to the fixed structure 31. The fixed structure 31 comprises, for example, a front frame 46 which fixedly connects it to the fan casing 11, preferably via a knife-edge assembly located downstream of the outer shell 11. This front frame 46 contains a profiled aerodynamic part referred to as the deflection edge 46B, which guides the reverse jet flow.

Here, the fixed structure 31 also comprises a plurality of deflection cascades 32 arranged adjacent to one another about the axis A1, according to a circumferential direction of the reverser 30 and of the propulsion assembly 1. Moreover, the mobile structure 29 comprises the aforementioned mobile reverser cowls 33, for example two cowls 33 each extending over an angular amplitude of about 180°. This two-cowl configuration 33 is particularly well suited in the case of a nacelle design wherein the cowls/walls 18 are also mounted articulated, the reverser 30 then having a so-called "D-Duct" architecture. In this architecture, the cowls 18, 33 are connected so as to open/close simultaneously during maintenance operations on the engine. Nevertheless, other architectures are possible, such as a so-called "C-Duct" architecture, or a so-called "O-Duct" architecture.

Each mobile reverser cowl 33 comprises a radially outer wall 50, forming an outer aerodynamic surface of the reverser and of the nacelle, this surface being surrounded by the outside air. Each cowl 33 also comprises a radially inner wall 52 participating in the delimitation of the secondary flow path 21B radially outward. This wall 52 is located in the downstream continuity of the outer shell 40 of the intermediate casing. The two walls 50, 52 define a cavity 54 preferably open axially to the front, at the upstream end of the reverser cowl 33.

FIG. 1 shows the reverser 30 in a advanced direct-thrust configuration, known as "direct jet", corresponding to a standard flight configuration. In this configuration, the cowls 33 of the mobile structure 29 are in a closed position, known as advanced "direct jet" or thrust position, wherein these reverser cowls 33 are bearing on the fixed structure 31, in particular on the deflection edge 46B forming an integral part of the latter. Indeed, in the direct-thrust configuration, the upstream end 52*a* of the radially inner wall 52 of each cowl 33 is axially bearing against the deflection edge 46B.

The mobile cowl 33 is held in the advanced direct-thrust position by means for locking this cowl on the fixed structure 31 of the reverser. These controlled locking means (not shown) are conventional, therefore they will not be described further. As an indicative example, active latches capable of unlocking under load may be implemented to counteract the compressive force of a seal between the mobile structure and the deflection edge. This type of latch can supercharge the seal so that the unlocking can then be controlled.

The mobile structure 29 is thus translatable relative to the fixed structure 31 along the axis A1 of the reverser, between the advanced direct-thrust position shown in FIG. 1, and a retracted thrust-reversal position which will be described later. When the mobile structure 29 is in the advanced direct-thrust position, the deflection cascades 32 are arranged in the cavity 54 of the reverser cowls 33, isolated from the secondary flow path 21B by the radially inner wall 52 of these sliding reverser cowls 29. This wall 52, forming the outer wall of the secondary flow path, is also referred to as the acoustic inner panel.

Figure 2:
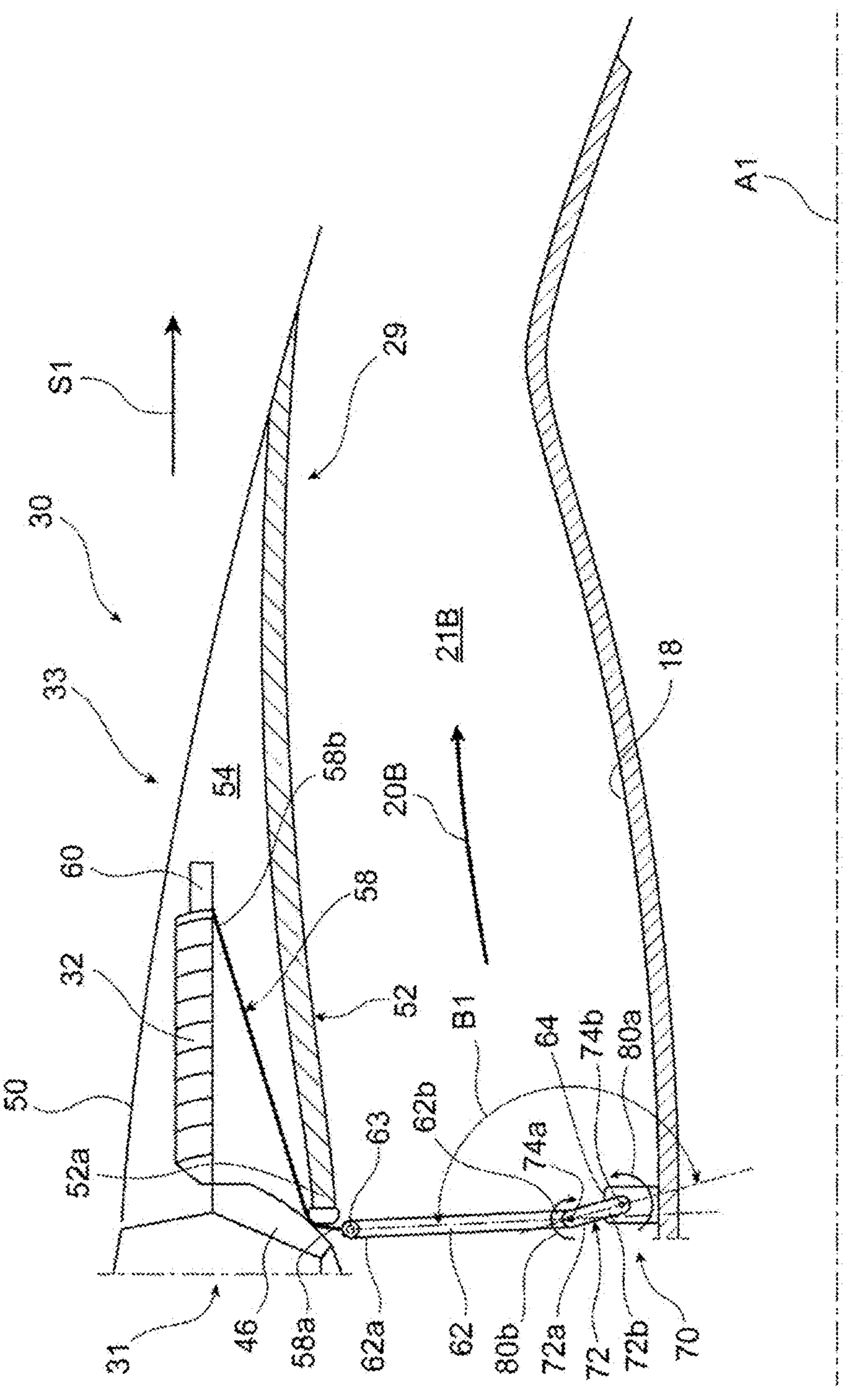
FIG. 2 is a schematic longitudinal sectional half-view of the reverser equipping the propulsion assembly shown in FIG. 1, more detailed and in the form of a first preferred embodiment of the invention, with the reverser shown in a direct-thrust configuration.
Figure 2A:
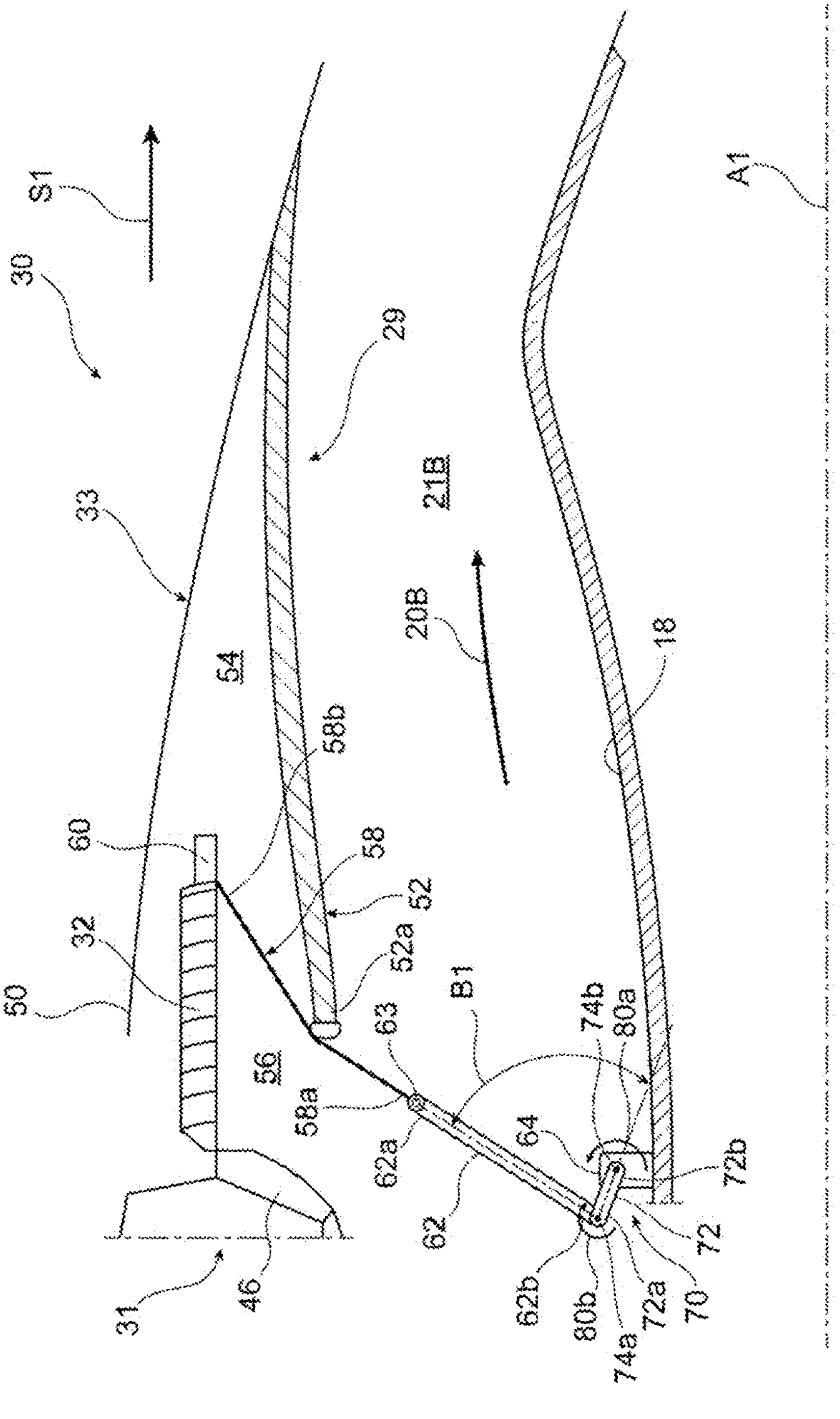
FIG. 2A is a schematic half-view of the reverser shown in FIG. 2, with the reverser shown in an intermediate configuration between the direct-thrust configuration, and the thrust-reversal configuration.
Figure 3:
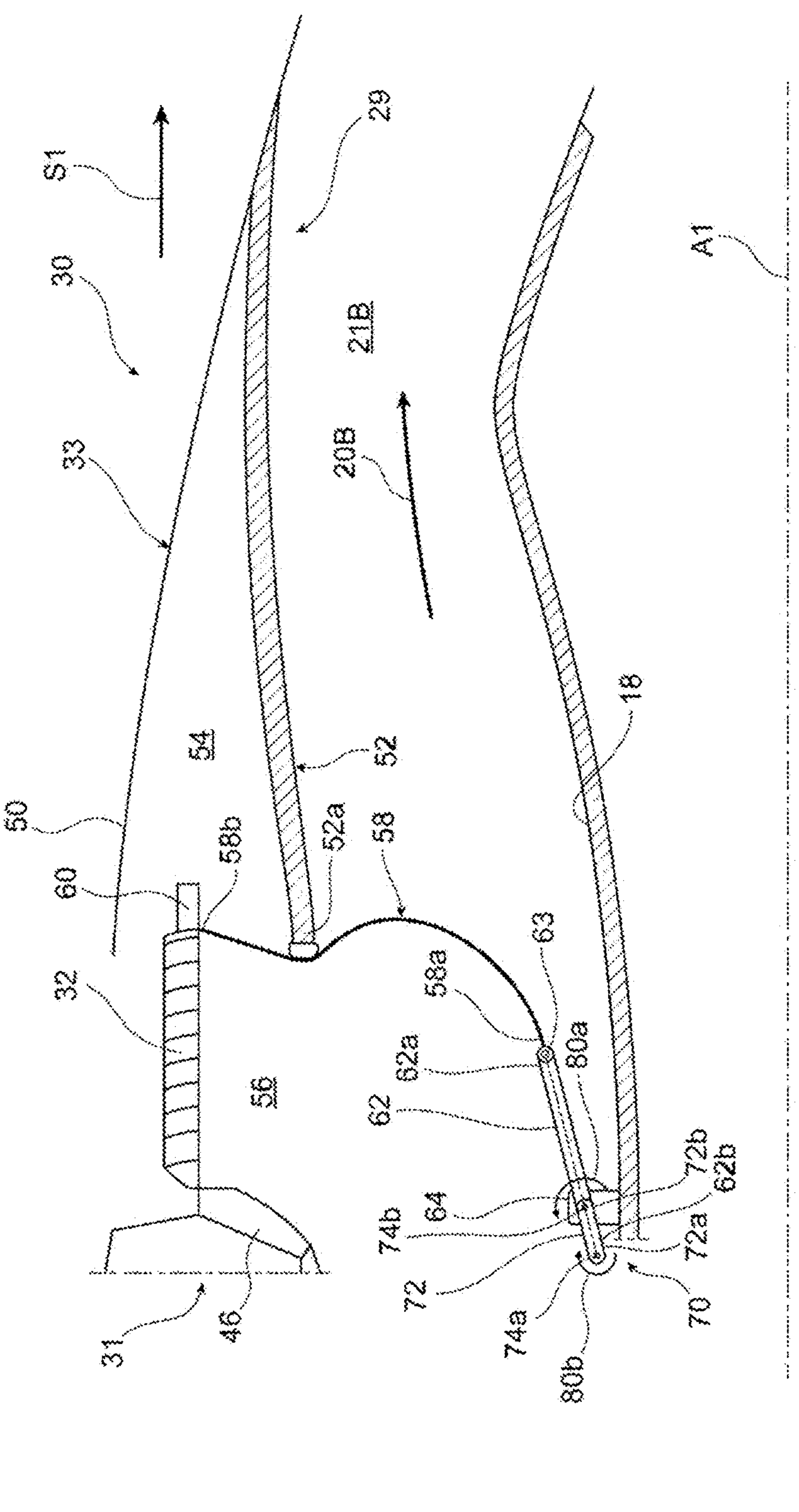
FIG. 3 is a schematic half-view of the reverser shown in FIG. 2, shown in a thrust-reversal configuration.
Figure 4:
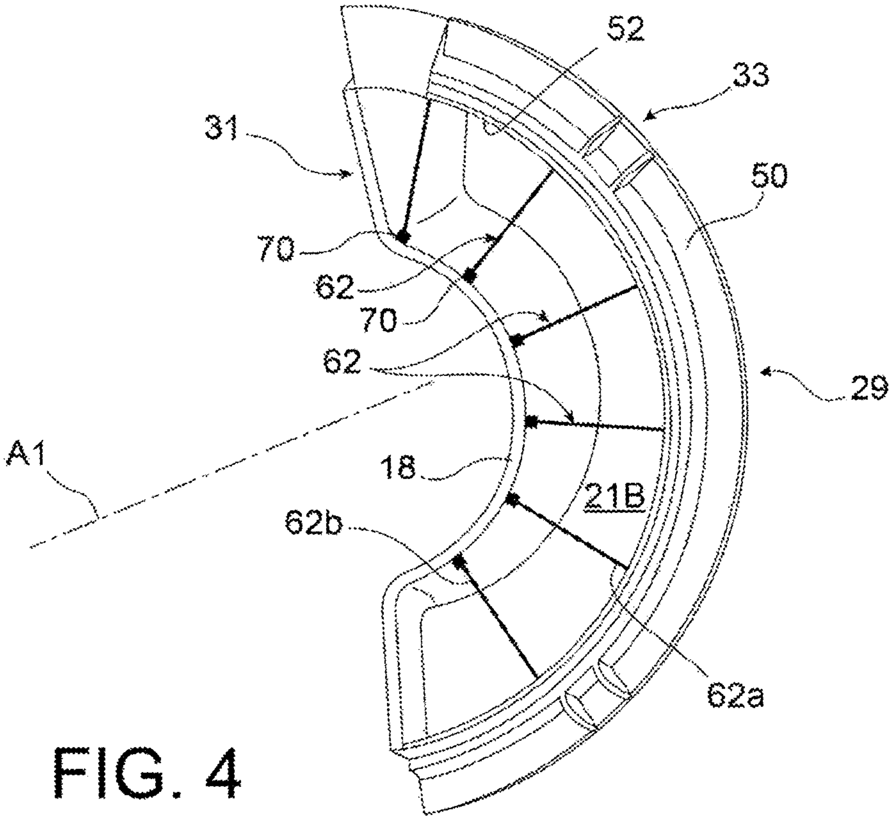
FIG. 4 is a perspective view of the reverser shown in FIGS. 2 and 3, shown in a direct-thrust configuration.
Figure 5:
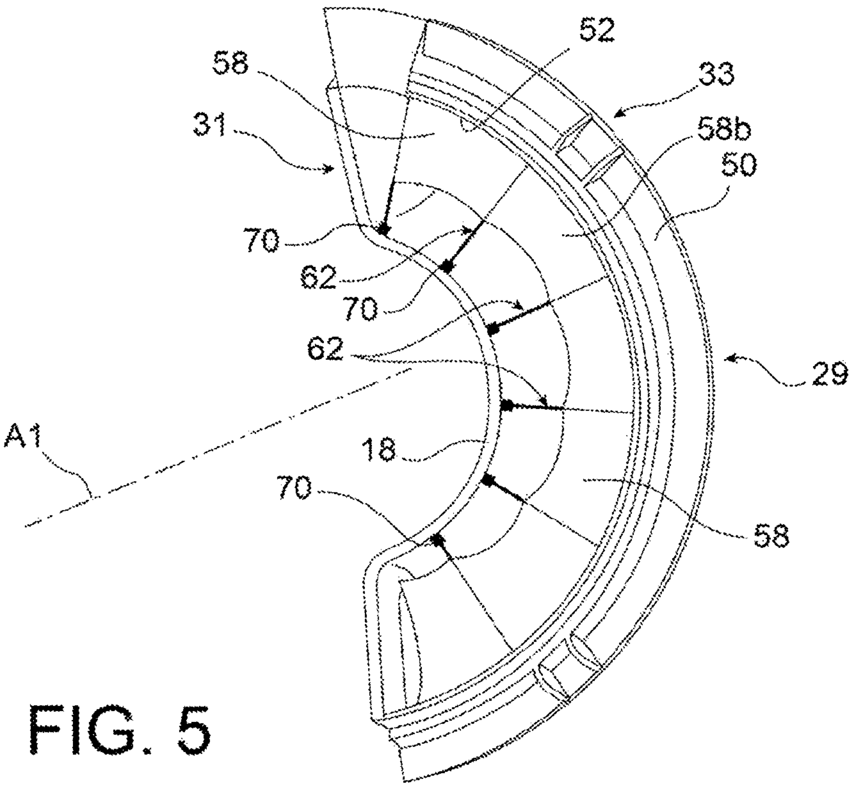
FIG. 5 is a perspective view of the reverser shown in FIG. 4, shown in a thrust-reversal configuration.

This direct-thrust configuration is also shown in FIGS. 2 and 4, while the retracted thrust-reversal position of the mobile structure 29 is shown in FIGS. 3 and 5, FIG. 2A showing an intermediate configuration between the two preceding ones, observed during the opening and closing of the reverser.

In FIG. 3, it is shown that the retracted inner acoustic panel 52 of the reverser cowls reveals upstream a passage opening 56 from the secondary flow path 21B to the deflection cascades 32. The opening 56 is therefore also delimited upstream by the deflection edge 46B, which widens radially outward toward the rear, to direct an air flow intended to pass through the cascades 32 when the mobile system is in this retracted thrust-reversal position. In other words, the deflection edge 46B progressively moves away from the axis A1 when going from the front toward the rear, to guide/deflect the air toward the cascades 32 in the thrust-reversal configuration. Downstream, the passage opening 56 is delimited in particular by the upstream end 52*a* of the radially inner wall 52.

In order to deflect at least a part of the secondary flow 20B toward the passage opening 56 defined axially between the deflection edge 46B and the upstream end 52*a* of the radially inner wall 52 of each cowl 33, the reverser 30 comprises one or more sealing membranes 58. Subsequently, an embodiment will be described wherein one single membrane 58 is associated with each reverser cowl 33 having an identical or similar angular amplitude, however, providing several circumferentially adjacent membranes associated with each cowl 33 is still possible. Similarly, only the cooperation between a membrane 58 and its associated cowl 33 will be described below, it being understood that this cooperation is identical or similar for all of the cowls of the reverser 33. However, it should be noted that in addition to the possibility of providing several membranes 58, one or several, more conventional, rigid sealing flaps may be provided in combination with this/these membrane(s), for example alternating in the circumferential direction.

The membrane 58 may be made of a material known to a person skilled in the art for this type of application. For example, it may consist of an unimpregnated fabric, for example aramid fibers. The membrane 58 may also be made using a composite material, the matrix of which is particularly flexible, for example made of aliphatic polyurethane, which allows use under different temperature conditions, in particular under lower temperatures in the case of an aliphatic polyurethane membrane than in the case of a silicone membrane. The matrix results in a low capacity to bend back and the behavior of the structure obtained is indeed that of a membrane. One of the major properties of this membrane 58 is that it is able to be folded perfectly reversibly (elastically or by sliding fibers) with a very small radius of curvature relative to its surface, and that it has a very small thickness, for example in the range of 0.1 to 3 mm. For information purposes, one could observe that this membrane 58 behaves like a boat sail or a parachute/flying wing when it is pressurized.

It is reminded that in a conventional cascade reverser, the mobile structure slides relative to the fixed structure by means of a rail/slide system which guides the mobile structure from the front to the rear during the reverser opening phase, and from the rear to the front during the closing phase. A force to the rear applied to the mobile structure of the reverser therefore causes movement thereof to the rear, relative to the fixed structure. This force is usually generated by conventional actuators such as cylinders or ball screws.

Again with reference to FIGS. 1 to 5 showing a first preferred embodiment of the invention, the membrane 58 has two opposite ends, namely a first end 58*a* connecting to one or more actuation connecting rod(s) 62, as well as a second end 58*b* connected to a rear frame 60 for supporting the cascades 32. This support is annular or in the form of an annular section effectively connecting the rear end of several adjacent cascades.

The first membrane end 58*a* is therefore connected to one or more deployment connecting rods 62 arranged in the secondary flow path 21B. These are, for example, several connecting rods 62 which are circumferentially spaced apart from each other, and which are each connected to the first membrane end 58*a* via a specific connection point 63 for each connecting rod. Nevertheless, hereinafter in the description, only one connecting rod will be described, it being understood that the design of the other connecting rods is identical or similar, as well as their cooperation with surrounding elements.

The connection point 63 thus connects the first membrane end 58*a* to a first end 62*a* of the deployment connecting rod 62.

Furthermore, an actuating device 70, specific to the invention, connects the radially inner wall 18 delimiting the flow path to a second end 62*b* of the connecting rod, opposite the first end 62*a*. This device 70, used to actuate the connecting rod 62, will be described below.

As can be seen in FIGS. 1, 2 and 4, when the mobile structure 29 is occupying its advanced direct-thrust position, at least a part of the sealing membrane 58 is arranged radially between the deflection cascades 32 and the radially inner wall 52 of the reverser cowl 33, in the cavity 54. Preferably, the part of the membrane 58 located in this cavity 54 of the reverser cowl 33 radially covers the entire length of the cascades 32. Hence, when the mobile structure 29 adopts its advanced direct-thrust position, the first end 58*a* of the membrane 58 is pinched between the upstream end of the wall 18, and the deflection edge 46B, in the vicinity of the connection point 63 which is located in the flow path. In order to avoid possible damage to the membrane 58 due to this pinching, the deflection edge 46B may locally have a notch of a shape adapted to receive the upstream end 52*a* of the wall 52. Thus, the membrane 58 is also pressed into this notch of the deflection edge 46B, by bearing on the upstream end of the wall 52.

In addition, as can be seen in FIGS. 2A and 3, when the mobile structure 29 is moving and is occupying its retracted thrust-reversal position at the end of this movement, the sealing membrane 58 is partially bearing against the upstream end 52*a* of the radially inner wall 52 of the reverser cowl, therefore corresponding to the acoustic panel. More specifically, during the movement to the rear of the mobile structure 29, the membrane 58 slides on this upstream end 52*a* of the radially inner wall 52.

Figure 3A:
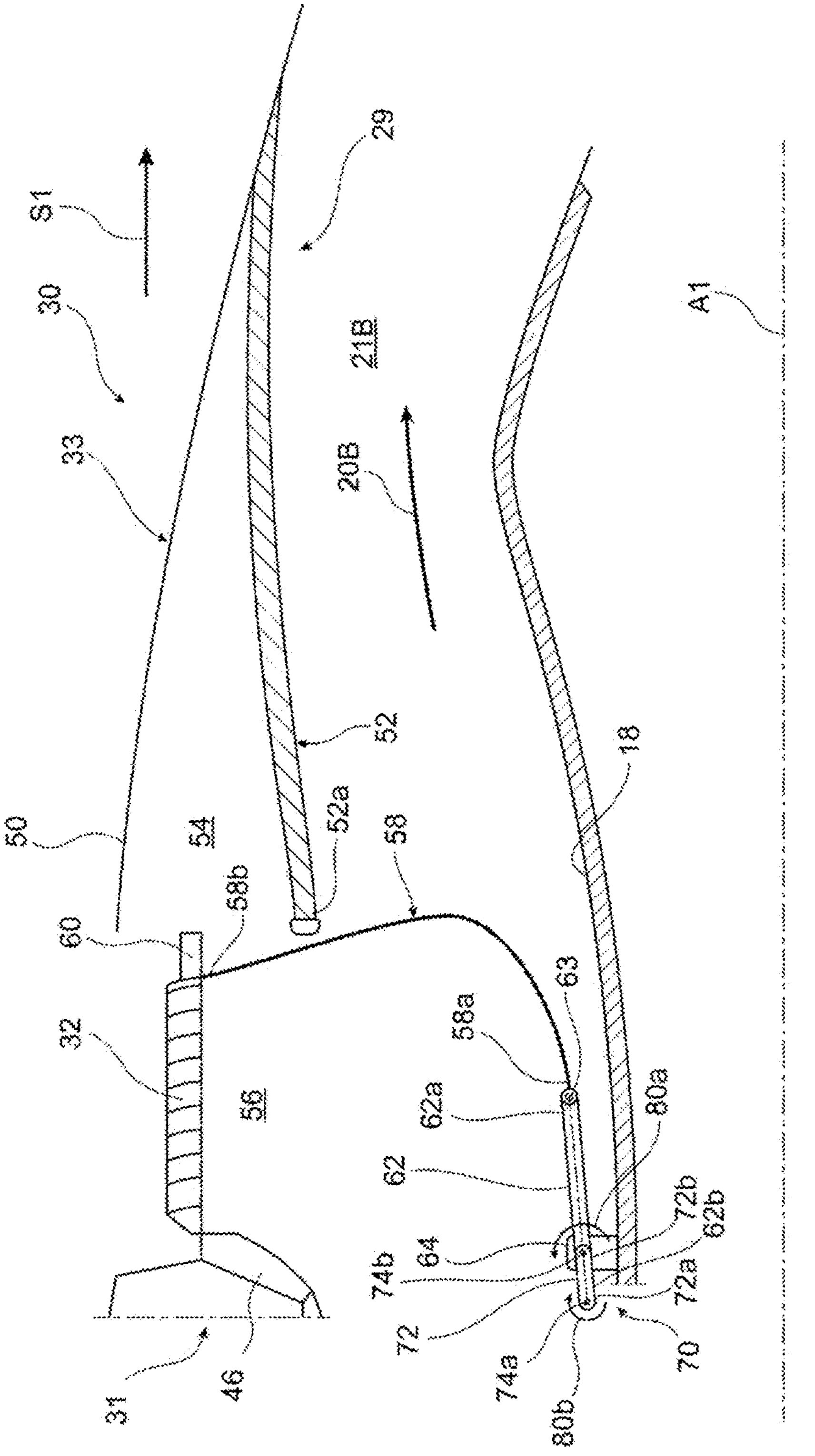
FIG. 3A is a schematic half-view similar to that of the preceding figure, with the reverser shown according to an alternative embodiment.

In the retracted thrust-reversal position of FIG. 3, the membrane 58 is therefore axially bearing downstream against the upstream end 52*a*. It should be noted that, depending on the extent of the axial travel of the reverser, the membrane 58 may no longer be in contact with the inner acoustic panel 52 in the fully deployed position of the reverser, where the cowl 33 is in its most retracted position. Such a configuration is shown in FIG. 3A, wherein it is shown that the membrane 58 is upstream and away from the upstream end 52*a* of the wall 52 of the reverser cowl. The contact option corresponds to a minimized travel of the reverser, whereas the non-contact option generally corresponds to a smoother membrane shape in the reverse jet configuration, therefore performing better from an aerodynamic point of view.

Thus, the part of the membrane 58 which is located radially outward relative to its bearing zone on the wall 52 seals off a part of the upstream axial opening of the cavity 54, whereas the other part located radially inward seals off at least a part of the secondary flow path 21B, thereby deflecting at least a part of the secondary flow 20B toward the passage opening 56 in the direction of the cascades 32.

Another possibility, not shown, consists in performing the radially outer attachment of the membrane 58 to the radially outer wall 50 of the sliding cowl 33. As stated above, the device 70 for actuating the connecting rod connects the radially inner wall 18 delimiting the flow path (also known as IFS, standing for "Inner Fixed Structure"), to the second end 62*b* of the connecting rod, corresponding to the radially inner end in the direct-thrust configuration. The device 70 and the reverser assembly are designed such that the connecting rod 62 is moved from a first position projecting radially into the secondary flow path when the mobile structure 29 is occupying its advanced direct-thrust position, to a second position folded down toward the downstream direction when the mobile structure 29 is occupying its retracted thrust-reversal position, and vice versa. In the first position shown in FIG. 2, the connecting rod 62 can indeed adopt a radial or substantially radial orientation in the flow path 21B, a slight inclination relative to this radial direction nevertheless remaining possible, for example up to a value of 10 to 20°. The connecting rod 62 has a substantial length, for example greater than half of the radial thickness of the flow path 21B at the point where the connecting rod is located, and even more preferably a length greater than two thirds of this radial thickness.

The actuating device 70 firstly comprises an actuating member 72, in the form of a small connecting rod or fork, having a first end 72*a* at which a first articulated connection 74*a* is located with the second connecting rod end 62*b*. This first articulated connection 74*a* preferably has a pivot/rotation axis of circumferential, or substantially circumferential, orientation. A second end 72*b* of the member 72, opposite the first end 72*a*, is connected to the radially inner delimiting wall 18 via a second articulated connection 74*b*, preferably with a pivot/rotation axis parallel or substantially parallel with that of the first articulated connection 74*a*. For this purpose, a fitting 64 is integral with the fixed wall 18, and forms the second articulated connection 74*b* with the second end 72*b* of the member 72.

It is noted that in a direct-thrust configuration, the connecting rod 62 and the actuating member 72 form a projecting angle B1 opening in the downstream direction, this angle B1 being high and preferably between 150 and 175°. For this purpose, the member 72 also has a substantially radial orientation in this direct-thrust configuration.

The connecting rod 62 and the member 72 form a three-point mechanical system together with respectively the connection point 63 of the membrane, the first articulated connection 74*a*, and the second articulated connection 74*b*. This three-point mechanical system, comparable to a "knee" type joint, is such that during the movement of the mobile structure 29 from its advanced direct-thrust position to its retracted thrust-reversal position, a relative movement of the connecting rod 62 occurs relative to the actuating member 72 about the first articulated connection 74*a*, which at least in a first phase causes a decrease in the projecting angle B1, as can be seen in FIG. 2A. The mechanical system then tends to retract.

To promote the retraction of this three-point mechanical system during the opening of the reverser, preferably passive stressing means are provided, which firstly comprise first elastic return means 80*a*, shown only schematically by an arrow in the figures concerned. These first means 80*a*, for example of the hinge spring type, force the member 72 to tilt about the second articulated connection 74*b* in a first direction of rotation, corresponding to the counterclockwise direction in the figures. This first direction of rotation is such that it causes the first end 74*a* of the member 74 to tilt in the upstream direction and radially inward during an initial phase of movement of the mobile structure 29 from its advanced direct-thrust position, to its retracted thrust-reversal position.

The passive stressing means also comprise second elastic return means 80*b*, shown only schematically by an arrow in the figures concerned. These second means 80*b*, for example also of the hinge spring type, force the connecting rod 62 to tilt relative to the member 72 about the first articulated connection 74*a*, in a second direction of rotation opposite the first direction, and therefore corresponding to the clockwise direction in the figures.

Also, thanks to the set of elements described above which form the reverser, it makes it possible to ensure that during the initial phase of movement of the mobile structure 29 from its advanced direct-thrust position to its retracted thrust-reversal position, the actuating device 70 causes a movement, via its member 74, of the first articulated connection 74*a* radially inward and/or axially upstream.

By pulling in this way on the connecting rod 62 at the start of the opening of the reverser, the membrane 58 which starts to deploy in the flow path 21B is advantageously prevented from pressing against the radially inner surface of the wall 52 of the cowl 33, moving to the rear. Thus, instead of a simple pivoting of the connecting rod 62 relative to the wall 18 at its second end 62*b*, the latter is moved with the first connection 74*a* in the upstream direction and inward by the device 70, in order to cause a kind of detachment of the membrane. The deployment of this membrane 58 is substantially improved and made more reliable.

Moreover, thanks to the presence of the first and second elastic return means 80*a*, 80*b*, they exert forces on the membrane 58 even in a direct-thrust configuration. This makes it possible to hold this membrane in tension when it is stored in the cowl cavity 54, and thus contributes to its stability and to facilitating its deployment during a subsequent operation of opening the reverser. Similarly, the three-point mechanical system and its associated elastic return means 80*a*, 80*b* make it possible to tolerate, if needed, relative radial displacements between the two walls 18, 52 in a direct-thrust configuration.

As the mobile structure 29 moves to the rear, the connecting rod 62 continues to fold down toward the downstream direction and the member 72 continues to fold down toward the upstream direction, with the consequence of decreasing the projecting angle B1 between these two elements. In this regard, it is noted that the first elastic return means 80*a* are sized so as to generate on the second end 72*b* of the member 72 a moment of sufficient intensity to counteract the opposite moment, applied via the connecting rod 62 to its first end 72*a*, by the membrane 58 inflating with air in the flow path 21B.

The second elastic means 80*b*, by virtue of their stressing direction, for their part, help thrust the first membrane end 58*a* into the flow path 21B, so that it takes air therein and is deployed gradually therein.

Another advantage associated with the presence of the elastic return means 80*a*, 80*b* lies in the easy detection, in the maintenance phase, of a possible connection problem between the first membrane end 58*a* and the connecting rod(s) 62. Indeed, usually, this type of detection proves to be particularly complex due to difficult visual access to this junction. In the proposed design, any connecting rod 62 subject to a defect of connection to the membrane 58 will automatically retract into the flow path 21B in its second position folded down toward the downstream direction, under the combined action of the elastic return means 80*a*, 80*b*. Such a connecting rod folded down in the flow path 21B remaining readily identifiable by an operator carrying out maintenance operations, the aforementioned detection proves to be effectively simplified.

As indicated above, during the opening of the reverser, the three-point mechanical system retracts resulting in the progressive reduction of the projecting angle B1, until, for example, it becomes zero at the end of opening, as can be seen in FIGS. 3 and 3A. In this configuration where the connecting rod 62 adopts its second position folded down toward the downstream direction, the three points are aligned or substantially aligned, with the second articulated connection 74*b* located between the first articulated connection 74*a* and the connection point 63. This alignment is produced parallel or substantially parallel with the axial direction of the reverser.

Figure 6:
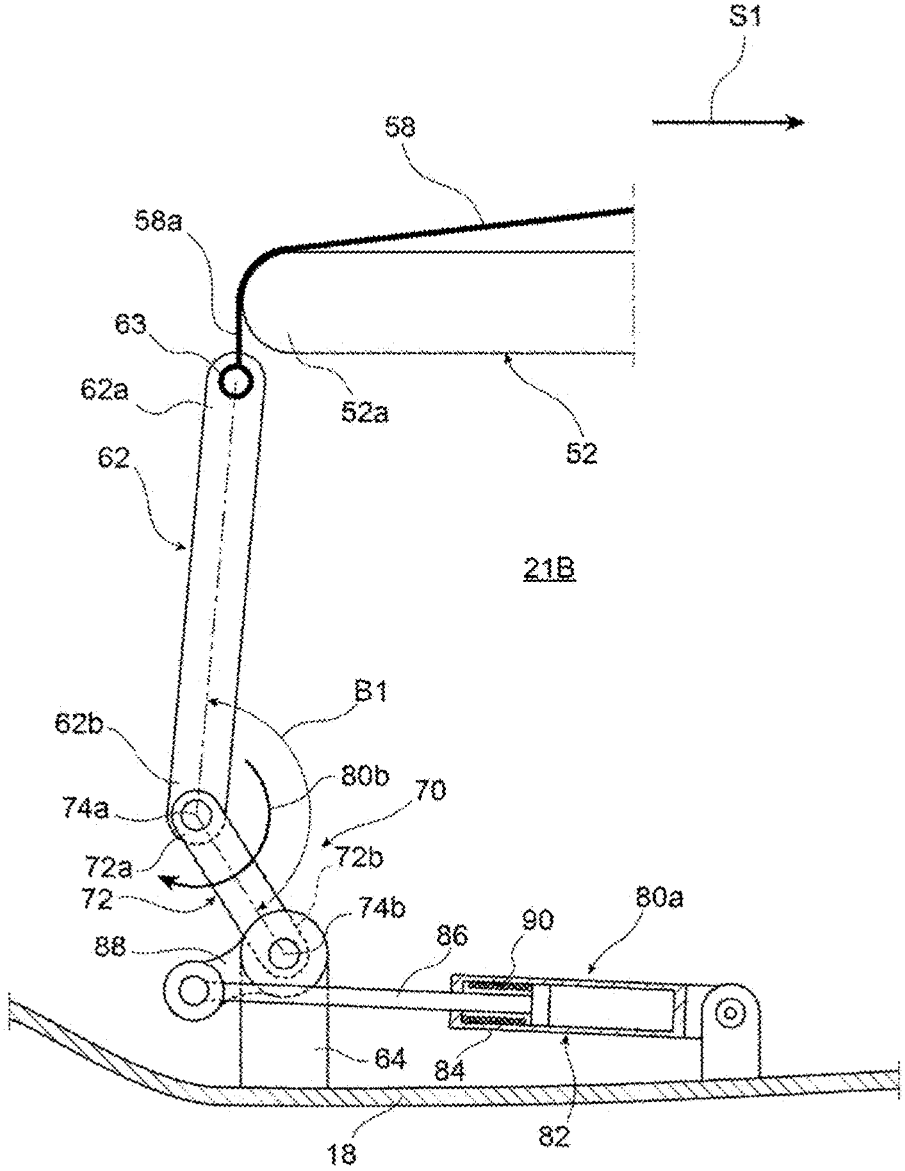
FIG. 6 is a schematic longitudinal sectional half-view of a part of the reverser shown in the form of an alternative embodiment, with this reverser shown in a direct-thrust configuration.
Figure 7:
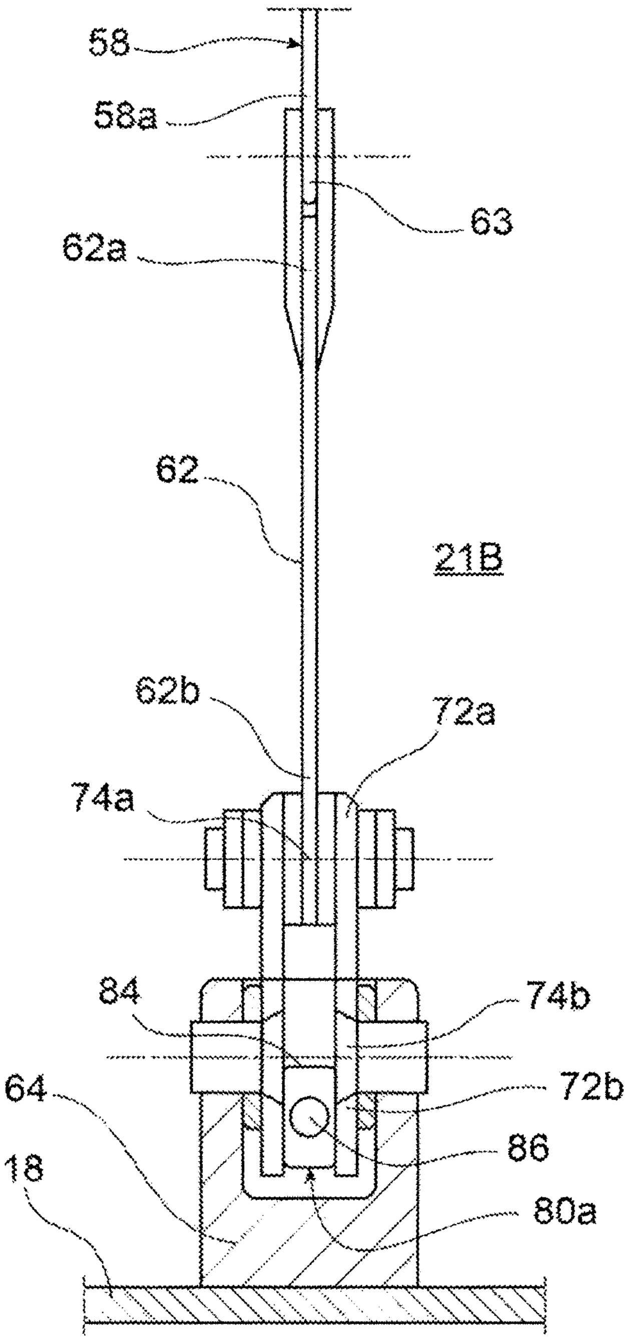
FIG. 7 is an axial view of the part of the reverser shown in the preceding figure.
Figure 8:
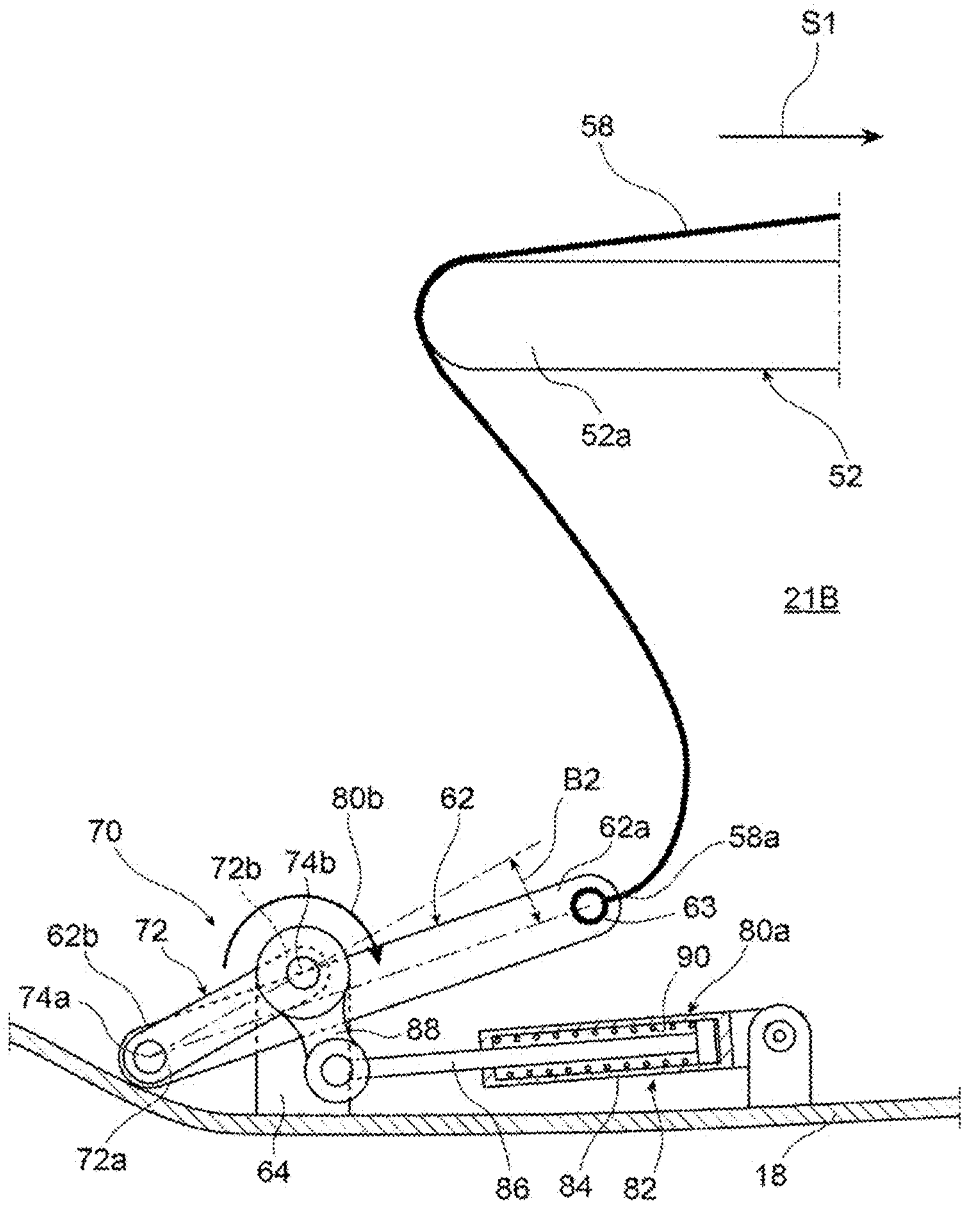
FIG. 8 is a schematic half-view of the reverser shown in FIG. 6, shown in a thrust-reversal configuration.

According to an alternative shown in FIGS. 6 to 8, the first and second elastic return means 80*a*, 80*b* force, at the end of the operation of opening the reverser, the movement of the connecting rod 62 beyond the position wherein said three points are aligned. Thus, after having been zero, the projecting angle B1 is inverted to give rise to another projecting angle B2 shown in FIG. 8, placing the three-point mechanical system in a mechanical locking position of the connecting rod 62. This angle B2, also open in the upstream direction but this time with the connecting rod 62 located radially inward relative to the member 72, may remain low, for example less than 20°.

Once the alignment position of the three points has been passed, the connecting rod 62 cannot pivot again in the counterclockwise direction relative to the member 72, as long as the mobile cowl 33 is not moved again in the upstream direction following a reverser closure command. The locking position of the connecting rod 62 advantageously allows it to keep the membrane 58 deployed in a tensioned manner, and to withstand very high-intensity stress, which would remain extremely difficult to counteract using simple elastic return means.

In this alternative, the design of the first elastic return means 80*a* may be modified, by providing a spring cylinder. This cylinder 82 comprises a cylinder body 84 mounted articulated on the wall 18, and a mobile cylinder rod 86. At its end, the rod 86 is articulated on the end of an arm 88 integral with the actuating member 72. Inside the cylinder 82, a spring 90 forces, via the rod 86 on which it acts, pivoting of the arm 88 and the member 72 in the second counterclockwise direction. The arm 88 and the actuating member 72 form a mechanical return lever together.

At the hinge with the cylinder rod 86, the end of the arm 88 advantageously serves as a stop against the wall 18. This stop makes it possible to hold the mechanical system in the locking position, despite the forces that continue to be generated by the first elastic return means 80*a*, via the compression spring 90.

Regardless of the design selected for the first and second elastic return means 80*a*, 80*b*, they preferably make it possible to generate the aforementioned forces throughout the opening phase of the reverser. By design, these forces may decrease as this opening takes place, due to the progressive release of the springs.

It should be noted that during an operation of closing the reverser, reverse movements take place for the connecting rod 62 and the actuating member 72, simultaneously resulting in loading of the first and second elastic return means 80*a*, 80*b*. In the final phase of an operation of closing the reverser, the particular kinematics applied by the actuating device 70 also prevents the risks of mechanical collision between the first connecting rod end 62*a*, and the upstream end 52*a* of the acoustic wall 52.

Figure 9:
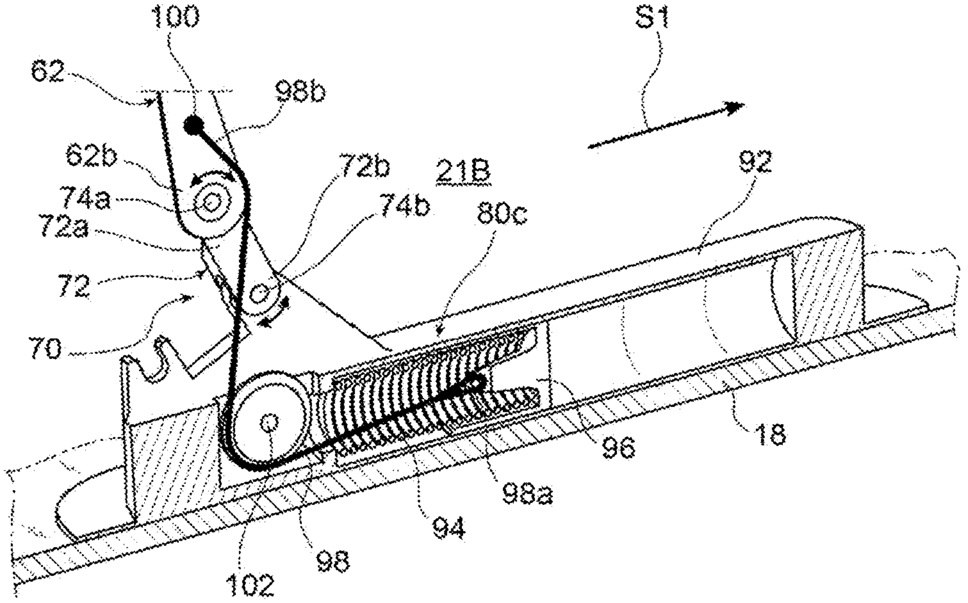
FIG. 9 is a schematic longitudinal sectional half-view of a part of the reverser shown in the form of a second preferred embodiment of the invention, with this reverser shown in a direct-thrust configuration.
Figure 10:
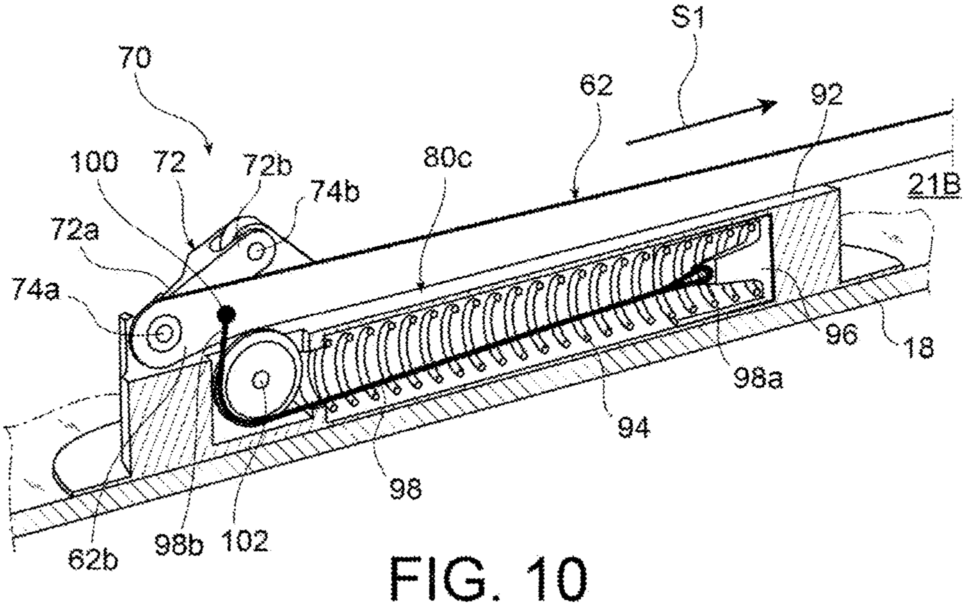
FIG. 10 is a schematic half-view of the reverser shown in FIG. 9, shown in a thrust-reversal configuration.

According to a second preferred embodiment shown in FIGS. 9 and 10, the stressing means comprise third elastic means which make it possible to generate the same functions as those of the first and second elastic means 80*a*, 80*b* of the first preferred embodiment described above.

The third elastic return means 80*c* comprise a hollow body 92 attached to the wall 18. Inside this body, a compression spring 94 is provided bearing at one of its ends against one end of the body 94, and bearing at the other of its ends on a seat 96 mobile in translation inside the body, preferably along the axial direction or substantially along this direction.

A transmission member, of the cable 98 type, comprises a first end 98*a* connected to the third elastic means 80*c*, while being connected to the mobile seat 96. Its second end 98*b*, opposite the first, is mounted on the deployment connecting rod 62, at a point 100 between the first articulated connection 74*a* and the connection point of the membrane (not seen in FIGS. 9 and 10).

A return pulley 102, about which the cable 98 travels, between its two ends 98*a*, 98*b*, is also provided. This pulley 102 is arranged such that in the first position projecting from the connecting rod 62, occupied in the direct-thrust configuration shown in FIG. 9, the cable 98 starts from its second end 98*b* in the direction of the return pulley 102, but by bypassing the first articulated connection 74*a* against which this cable 98 bears. The cable is bypassed on the side where the projecting angle B1 opens, i.e. downstream of the first connection 74*a*. In addition, in this configuration, a part of the cable 98 forms a V-shape open in the upstream direction with a rounded tip at the bearing against the first articulated connection 74*a*. Subsequently, the cable winds around the pulley 102 located aligned upstream of the spring 94, to reach the seat 96 by passing through the spring 94.

Thanks to this design, the third elastic means 80*c* transmit to the connecting rod 62, via the cable 98, forces simultaneously forcing the member 72 to tilt about the second articulated connection 74*b* in the first direction of rotation, and the connecting rod 62 to tilt relative to the member 72 about the first articulated connection 74*a*, in the second opposite direction.

In the thrust-reversal configuration shown in FIG. 10, where the spring 94 is more relaxed and released, the cable 98 is located at an axial distance downstream of the first articulated connection 74*a*, by simply winding around the return pulley 102.

Various modifications may be made by a person skilled in the art to the invention just described, only by way of non-limiting examples, and the scope of which is defined by the appended claims. For example, the thrust reverser 30 can alternatively have a "C-Duct" or "O-Duct" architecture. Furthermore, if the preferred embodiments described above relate to a design of a reverser with fixed deflection cascades, these cascades can alternatively be integrated into the mobile structure of the reverser.

What is claimed is:

1. A thrust reverser for an aircraft propulsion assembly, the reverser comprising a fixed structure equipped with a radially inner wall delimiting a secondary flow path of the propulsion assembly intended to be crossed by a secondary flow, the reverser also comprising a mobile structure comprising at least one mobile reverser cowl equipped with a radially inner wall contributing to the radially outer delimitation of the secondary flow path, the mobile structure being mobile relative to the fixed structure between an advanced direct-thrust position, and a retracted thrust-reversal position wherein the fixed structure and an upstream end of the retracted radially inner wall of the mobile reverser cowl reveal an air passage opening through the secondary flow path between them, the thrust reverser also comprising at least one membrane for sealing off the secondary flow path, designed to deflect at least a part of the secondary flow toward the passage opening, as well as at least one deployment connecting rod arranged in the secondary flow path and of which a first end is connected, via a connection point, to a first end of the sealing membrane, the connecting rod for deploying the membrane being designed to be moved from a first position projecting radially into the secondary flow path when the mobile structure is occupying its advanced direct-thrust position, to a second position folded down toward the downstream direction when the mobile structure is occupying its retracted thrust-reversal position, and vice versa, wherein the reverser also comprises a device for actuating the deployment connecting rod, the device connecting the radially inner wall delimiting the flow path to a second end of the deployment connecting rod opposite the first, via a first articulated connection, and in that the reverser is configured such that during an initial phase of movement of the mobile structure from its advanced direct-thrust position to its retracted thrust-reversal position, the actuating device causes said first articulated connection of the deployment connecting rod to move radially inward and/or axially upstream.

2. The thrust reverser according to claim 1, wherein the actuating device comprises an actuating member having a first end at which said first articulated connection of the deployment connecting rod is located, as well as a second end opposite the first, connected to the radially inner wall delimiting the flow path via a second articulated connection, and in that in the advanced direct-thrust position of the mobile structure, the deployment connecting rod and the actuating member form a projecting angle opening in the downstream direction.

3. The thrust reverser according to claim 2, wherein the actuating device comprises stressing means designed to:

force the actuating member to tilt about the second articulated connection in a first direction of rotation, said first direction of rotation being such that it causes the first end of the actuating member to be tilted in the upstream direction during said initial phase of movement of the mobile structure from its advanced direct-thrust position to its retracted thrust-reversal position; and force the deployment connecting rod to tilt relative to the actuating member, about the first articulated connection and in a second direction of rotation opposite the first direction.

4. The thrust reverser according to claim 3, wherein the stressing means have a passive design, and they comprise elastic return means.

5. The thrust reverser according to claim 2, wherein the deployment connecting rod and the actuating member form a three-point mechanical system together with respectively the connection point of the membrane, the first articulated connection and the second articulated connection, the reverser being designed such that during the movement of the mobile structure from its advanced direct-thrust position to its retracted thrust-reversal position, a relative movement of the deployment connecting rod relative to the actuating member, about the first articulated connection, takes place beyond a position wherein said three points are aligned, up to a mechanical locking position of the connecting rod.

6. The thrust reverser according to claim 5, wherein the mechanical system comprises stop means for holding this system in the mechanical locking position of the connecting rod.

7. The thrust reverser according to claim 3, wherein said stressing means comprise:

first elastic return means for forcing the actuating member to tilt about the second articulated connection in the first direction of rotation, said first elastic means preferably comprising a hinge spring or a spring cylinder acting on an arm integral with the actuating member; and second elastic return means for forcing the deployment connecting rod to tilt relative to the actuating member, about the first articulated connection in the second direction of rotation, said second elastic means preferably comprising a hinge spring.

8. The thrust reverser according to claim 3, wherein said stressing means comprise:

third elastic return means;

a transmission member of which a first end is connected to the third elastic means, and of which a second end opposite the first is mounted on the deployment connecting rod, between the first articulated connection and the connection point; and a return pulley about which the transmission member travels, this pulley being arranged such that the third elastic means transmit to the connecting rod, via the transmission member, forces simultaneously forcing the actuating member to tilt about the second articulated connection in the first direction of rotation, and the deployment connecting rod to tilt relative to the actuating member, about the first articulated connection, in the second direction of rotation.

9. The thrust reverser according to claim 8, wherein, in the advanced direct-thrust position of the mobile structure, the transmission member, for example in the form of a cable, starts from its second end in the direction of the return pulley by bypassing the first articulated connection on the side of said projecting angle.

10. An aircraft propulsion assembly, comprising a turbine engine and a nacelle comprising at least one fan cowl, as well as a thrust reverser according to claim 1.

* * * * *